Oct. 9, 1923.
G. A. RICHTER
1,469,958
APPARATUS FOR AND METHOD OF RECOVERING WASTE GASES
Filed Aug. 25, 1920
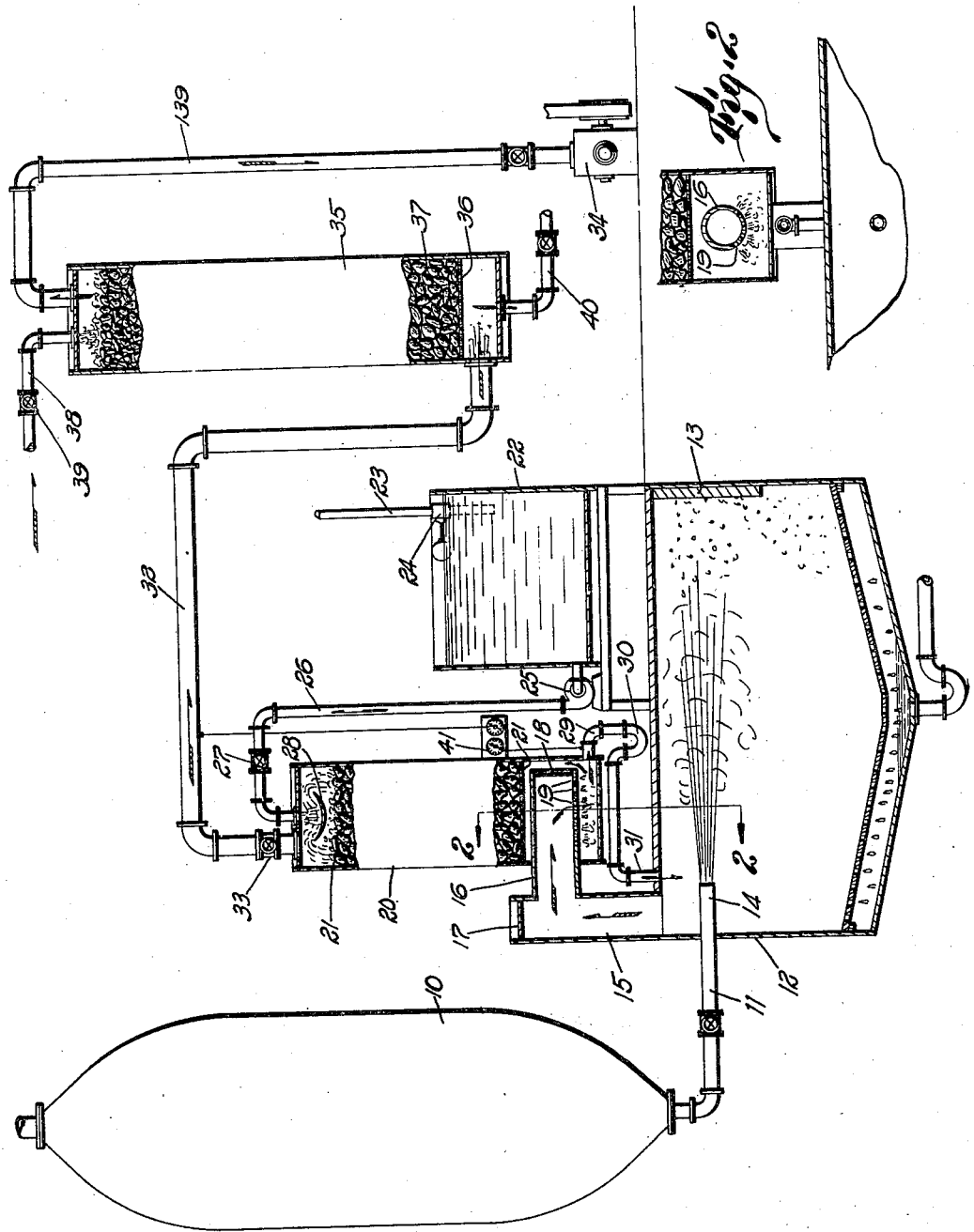

Patented Oct. 9, 1923.

1,469,958

UNITED STATES PATENT OFFICE.

GEORGE A. RICHTER, OF BERLIN, NEW HAMPSHIRE, ASSIGNOR TO BROWN COMPANY, OF BERLIN, NEW HAMPSHIRE, A CORPORATION OF MAINE.

APPARATUS FOR AND METHOD OF RECOVERING WASTE GASES.

Application filed August 25, 1920. Serial No. 405,915.

*To all whom it may concern:*

Be it known that I, GEORGE A. RICHTER, a citizen of the United States, residing at Berlin, in the county of Coos and State of New Hampshire, have invented new and useful Improvements in Apparatus for and Methods of Recovering Waste Gases, of which the following is a specification.

The object of the present invention is to recover sulphur dioxide gas from the vapors and gases discharged from the blow pit in the making of cellulose pulp by the sulphite process.

On the accompanying drawing,—

Figure 1 illustrates more or less conventionally and diagrammatically an apparatus embodying the invention and by which the improved process may be practiced.

Figure 2 represents a section on the line 2—2 of Figure 1.

On the drawing, a digester 10, of any type suitable for the digestion of cellulosic material with the usual cooking liquor (e. g. calcium bisulphite with more or less free sulphurous acid), is connected by the usual pipe 11 with a blow pit 12 having a target 13 against which the contents of the digester are discharged by the nozzle 14 on the end of the pipe 11. In place of the usual vomit stack, there rises from the blow pit a conduit having a short vertical section 15 and a lateral or horizontal section 16. An elbow tube could be employed for the purpose. As shown, however, the construction provides for a removal closure 17 at the upper end of the upright section 15. Through this conduit pass all the vapors and gases liberated in the blow pit when the contents of the digester are discharged thereinto. The end of the horizontal section is closed by a suitable closure 18, and the lower portion of said horizontal section is provided with numerous ports, slits or apertures 19 for the downward emission of vapors and gases. The horizontal section of the conduit extends laterally into the lower end of a condenser tower 20 which may be made of wood and located above the blow pit, and which contains a mass of inert interstitial material 21. As shown, the tower has the transverse perforated partition 21 immediately above the horizontal section 16 of the conduit, and by which said inert material is supported. The interstitial material may be "spiral brick," loose fragments of inert rock or other mineral material, to provide numerous interrupted tortuous passages for the counter-current flow of water and the vapors and gases delivered from the blow pit.

Water at seasonable temperature is contained in a storage tank 22, being supplied thereto by a pipe 23 equipped with a float valve or ball cock 24. From the lower portion of the storage tank, the water is forced by a pump 25 through a pipe 26 (valved as at 27) to the top of the condenser tower, and sprayed downwardly onto the mass of inert interstitial material. Any suitable nozzle or distributer may be employed, e. g. as at 28. At the lower end of the tower, there is an eduction pipe 29, for the water, which is trapped as at 30, and which has a delivery end or nozzle 31, located in the vertical longitudinal planes of the nozzle 14 and far enough beyond the end of the latter, so that the stream delivered from the condenser tower will contact with or impinge the stream delivered from the blow pit through the nozzle 14. A large gas conduit 32 (valved at 33) conducts the chilled gases from the top of the condenser tower, and is connected with a vacuum pump 34 to create a partial vacuum in the system back to the blow pit. The cooled gases, including sulphur dioxide, nitrogen, etc., may be conducted by conduits 32 to an absorptive system, which is here shown conventionally as a tower 35 with the lower end of which the pipe 32 is connected. The tower has the perforated horizontal partition 36 on which is supported either inert surface or interstitial material 37 (e. g. spiral brick, rock, or the like), or limestone, if desired. Cold water is delivered to the top of the tower from a suitable source of supply by a pipe 38 (valved as at 39), and the unabsorbed or uncombined inert gases are withdrawn from the top of the tower by the pipe 139 leading to the vacuum pump 34. The acid liquor is conducted from the lower end of the tower 35, by a valved eduction pipe 40, to a suitable tank for use in the acid liquor-making system in recharging the digesters. A recording thermometer 41 is connected to the inlet end of pipe 29 for indicating the temperature of the liquid passing through said pipe, and a similar thermometer is connected to the gas conduit 32 at a point near the tower 20.

It will be understood, of course, that a single blow pit and condensing system may serve for a bank of digesters, or that each digester may have a separate blow pit and condenser.

The process is as follows:—When the contents of the digester (e. g. spruce chips) have been cooked under proper conditions of temperature, pressure and time in the sulphite cooking liquor, until the cellulose fibers are freed to be separated from the lignin or cementitious content of the wood, the vacuum pump is set in operation and the blow pit is flushed with steam from any suitable source, to exclude oxygen as far as possible. The pump 25 is started to cause a downward flow of multitudinous small streams of cold water through the interstitial or surface material in the tower 20, water is caused to flow into the top of the tower 35, and the contents of the digester are blown through pipe 11 into the blow pit. The vapors and gases pass through conduit 15, 16, and emerge therefrom downwardly into the lower end of the condenser tower 20, and are drawn upwardly into contact with the downwardly flowing streams of colder water. During the counter-current flow of the water, and the gases and vapors, the vapors are condensed by the water. The flow of water through the condenser tower is carefully controlled by the pump 25 and the valve 27, so that outgoing gas from the tower is maintained, preferably below 100° F., and the outgoing water in pipe 29 is kept above 180° F., preferably from 190° to 200° F. This stream of water, however, is delivered into contact with the jet of pulp and liquor issuing from the blow pipe 11, and is thoroughly broken up and brought to the boiling point, so that any small amounts of sulphur dioxide gas contained therein are immediately liberated. The cold water entering the top of the tower effectively condenses all vapors passing upwardly through the tower and cools the remaining gases to a relatively low temperature so that the sulphur dioxide is ready for absorption as calcium bisulphite. As the sulphur dioxide gas from the blow pit comes into contact with the colder water entering the tower, a small amount is absorbed thereby, but, as the temperature of the water is gradually increased, more and more of the gas is liberated, until finally, just before the water is raised to the boiling point by its impingement upon the jet of pulp and liquor and all traces of the gas are removed therefrom, the water contains about .2% to .3% sulphur dioxide. The water delivered from the tower, being cooler than the stream of pulp and liquor, not only loses its contained gas, as stated, but also condenses some of the vapor in the blow pit, thus causing the blow pit to become, as it were, a part of the condenser system.

It will be observed that the conduit 15, 16, which leads the vapors and gases from the blow pit to the condenser tower, has its exit, slits or ports so arranged in the bottom portion of section 16 that the vapors and gases are first directed downwardly against the shallow pool of water which collects in the bottom of the tower, and are thereby cooled initially before they pass upwardly through the interstitial surface material.

The flow of water through the absorption tower 35 is so regulated that a fairly strong acid liquor is produced, i. e. one containing from 3% to 5% free sulphurous acid.

What I claim is:—

1. A process of recovering sulphur dioxide from blow-pit vapors and gases, which comprises conducting said gases and vapors and cold water in counter-current flow through a mass of interstitial surface material, thereby cooling the gases and condensing the vapors by direct contact thereof with the water, recovering the free unabsorbed sulphur dioxide which is cooled by said water, and then removing from the heated water the sulphur dioxide absorbed thereby.

2. A process of recovering sulphur dioxide from blow-pit vapors and gases, which comprises conducting said gases and vapors and cold water in counter-current flow through a mass of interstitial surface material, thereby cooling the blow pit gases and condensing the vapors by direct contact thereof with the water, recovering the sulphur dioxide from the gases cooled by said water, and then superheating the water to remove therefrom sulphur dioxide absorbed thereby.

3. A process of recovering sulphur dioxide from blow-pit vapors and gases, which comprises conducting said gases and vapors and cold water in counter-current flow through a mass of interstitial surface material, thereby cooling the gases and condensing the vapors by direct contact thereof with the water, and recovering sulphur dioxide from the gases cooled by said water.

4. A process of recovering sulphur dioxide from blow-pit vapors and gases, which comprises discharging the contents of a digester into a pit in a stream, condensing the vapors and cooling the gases arising from said pit by direct contact with water, and heating the water to liberate the gases absorbed thereby by causing the water to impinge upon the said stream.

5. A process of recovering sulphur dioxide from blow pit vapors and gases, which comprises discharging the contents of a digester into a blow pit in a stream, conducting the gases and vapors from such pit through a mass of interstitial surface material, causing water to flow in a counter direction through said material in the opposite direction, and liberating sulphur dioxide from such water by heating such water by the digester contents delivered to the blow pit.

6. A process of recovering sulphur dioxide from blow pit vapors and gases, which comprises discharging the contents of a digester into a blow pit in a stream, conducting the gases and vapors from such pit upwardly through a condenser containing a mass of inert interstitial material, conducting a liquid chilling medium downwardly through said mass to condense the vapors and cool the gases, heating said medium to the boiling point to liberate gases absorbed thereby, and recovering sulphur dioxide from said cooled gases.

7. The herein described process of recovering sulphur dioxide from vapors and gases, in the sulphite process, which comprises conducting the vapors and gases in a counter-current flow with water in contact with an inert interstitial material, thereby cooling the gases and condensing the vapors by direct contact with the water, recovering sulphur dioxide from the cooled gases, and regulating the flow of water to deliver the gases at a temperature of approximately 100° F. or less, and to deliver the water and condensate at a temperature of not less than 180° F.

8. The herein described process of recovering sulphur dioxide from vapors and gases, in the sulphite process, which comprises conducting the vapors and gases in a counter-current flow with water in contact with an inert interstitial material, thereby cooling the gases and condensing the vapors by direct contact with the water, and regulating the flow of water to deliver the gases at a temperature of approximately 100° F. or less, and to deliver the water and condensate at a temperature of not less than 180° F., and finally heating such water and condensate to their boiling point to drive off gases absorbed thereby, and recovering sulphur dioxide from such gases.

9. The combination with a digester, a blow pit and a blow pipe for delivering the contents of the digester into the blow pit, of a direct condenser communicating with the blow pit so as to receive the vapors and gases therefrom, and means for delivering the cooling water and the condensate from said condenser into contact with the stream delivered by the blow pipe.

10. The combination with a digester, a blow pit and a blow pipe for delivering the contents of the digester into the blow pit, of a condenser tower containing a mass of inert interstitial material, a conduit for delivering the vapors and gases from said blow pit to the lower end of said tower, means for delivering a liquid chilling medium to the upper end of said tower, and a pipe for delivering said medium and the condensate into said blow pit into contact with the stream of pulp and liquor from the blow pipe.

11. The combination with a digester, a blow pit and a blow pipe for delivering the contents of the digester into the blow pit, of a condenser tower located above the blow pit and containing inert interstitial material, a conduit rising from the blow pit and having a lateral section extending into the lower end of said tower to conduct vapors and gases thereto, means for delivering chilled water into the top of said tower, and a trapped pipe for delivering water and condensate from the lower end of said tower into said blow pit, and having its delivery end arranged in such relation to the delivery end of the blow pipe that the stream of water and condensate intersects the stream of pulp and liquor issuing from the blow pipe.

12. The combination with a digester, a blow pit and a blow pipe for delivering the contents of the digester into the blow pit, of a condenser tower arranged above the blow pit and containing a mass of inert interstitial surface material, a conduit leading from the blow pit into said lower end of said tower, a pipe for delivering water to the upper end of said tower, means for conducting water and condensate from the lower end of said tower, and a vacuum pump connected to the upper end of the tower.

In testimony whereof I have affixed my signature.

GEORGE A. RICHTER.